(12) United States Patent
Maes

(10) Patent No.: US 8,930,527 B2
(45) Date of Patent: Jan. 6, 2015

(54) HIGH AVAILABILITY ENABLER

(75) Inventor: Stéphane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 895 days.

(21) Appl. No.: 12/786,725

(22) Filed: May 25, 2010

(65) Prior Publication Data

US 2011/0131318 A1   Jun. 2, 2011

Related U.S. Application Data

(60) Provisional application No. 61/180,998, filed on May 26, 2009.

(51) Int. Cl.
| | | |
|---|---|---|
| *G06F 15/16* | (2006.01) | |
| *G06F 15/173* | (2006.01) | |
| *G06F 3/00* | (2006.01) | |
| *G06F 11/14* | (2006.01) | |
| *G06F 11/20* | (2006.01) | |

(52) U.S. Cl.
CPC .......... *G06F 11/1482* (2013.01); *G06F 11/202* (2013.01); *G06F 11/2097* (2013.01)
USPC ........... 709/224; 709/217; 709/225; 709/227; 709/228; 709/250; 710/17

(58) Field of Classification Search
None
See application file for complete search history.

(56) References Cited

U.S. PATENT DOCUMENTS

| | | | |
|---|---|---|---|
| 6,446,144 B1 | 9/2002 | Habusha et al. | |
| 7,023,800 B1 | 4/2006 | McAuley et al. | |
| 7,627,671 B1 * | 12/2009 | Palma et al. | 709/224 |
| 7,657,657 B2 | 2/2010 | Rao et al. | |
| 7,797,565 B1 | 9/2010 | Tran et al. | |
| 7,870,265 B2 | 1/2011 | Kramer et al. | |
| 7,940,650 B1 | 5/2011 | Sandhir et al. | |
| 8,001,250 B2 | 8/2011 | Langen et al. | |
| 8,042,000 B2 | 10/2011 | Birch et al. | |
| 8,095,688 B2 | 1/2012 | Maes | |
| 8,103,759 B2 | 1/2012 | Langley et al. | |
| 8,103,782 B2 | 1/2012 | Elleuch et al. | |

(Continued)

OTHER PUBLICATIONS

U.S. Appl. No. 11/670,150, filed Feb. 1, 2007, Notice of Allowance mailed Sep. 6, 2011, 15 pages.

(Continued)

*Primary Examiner* — Ranodhi Serrao
*Assistant Examiner* — Farrukh Hussain
(74) *Attorney, Agent, or Firm* — Kilpatrick Townsend & Stockton LLP

(57) ABSTRACT

Embodiments of the invention provide systems and methods for interacting with a high availability session. According to one embodiment, a method of providing high availability can comprise abstracting one or more functions of a high availability infrastructure via a high availability enabler and providing access to the abstracted one or more functions via a northbound interface of the high availability enabler. For example, the one or more functions of the high availability infrastructure can comprise session control, either synchronous session control or asynchronous session control, concurrency management, data distribution, e.g., possibly including storing at least some of the data local to the high availability enabler, caching, session replication, providing fault tolerance, providing predictable latencies, etc. The high availability infrastructure can comprise, for example JGroups, Oracle Coherence, or another high availability infrastructure. The method can include decoupling application level processing from protocol level processing via the high availability enabler.

23 Claims, 12 Drawing Sheets

(56) References Cited

U.S. PATENT DOCUMENTS

| | | | |
|---|---|---|---|
| 8,161,168 B2* | 4/2012 | Lankford et al. | 709/227 |
| 8,250,234 B2 | 8/2012 | Allen et al. | |
| 8,285,873 B2 | 10/2012 | Scott et al. | |
| 8,688,816 B2 | 4/2014 | Maes et al. | |
| 2004/0186918 A1 | 9/2004 | Lonnfors et al. | |
| 2005/0021670 A1 | 1/2005 | Maes | |
| 2005/0044188 A1 | 2/2005 | Nakazawa et al. | |
| 2005/0091362 A1 | 4/2005 | Shigeta et al. | |
| 2005/0097367 A1 | 5/2005 | Nakazawa et al. | |
| 2005/0125768 A1* | 6/2005 | Wong et al. | 717/100 |
| 2005/0138002 A1 | 6/2005 | Giacobbe et al. | |
| 2005/0203962 A1 | 9/2005 | Zhou et al. | |
| 2005/0213607 A1 | 9/2005 | Cashman et al. | |
| 2005/0246445 A1 | 11/2005 | Panasyuk et al. | |
| 2006/0026290 A1 | 2/2006 | Pulito et al. | |
| 2006/0090097 A1 | 4/2006 | Ngan et al. | |
| 2006/0153068 A1* | 7/2006 | Dally et al. | 370/219 |
| 2006/0168053 A1 | 7/2006 | Greata et al. | |
| 2006/0271812 A1 | 11/2006 | Horton et al. | |
| 2006/0271813 A1 | 11/2006 | Horton et al. | |
| 2007/0005973 A1 | 1/2007 | Mynam et al. | |
| 2007/0204017 A1 | 8/2007 | Maes | |
| 2007/0208862 A1 | 9/2007 | Fox et al. | |
| 2007/0220302 A1 | 9/2007 | Cline et al. | |
| 2007/0268922 A1 | 11/2007 | Dougan et al. | |
| 2008/0077705 A1 | 3/2008 | Li et al. | |
| 2008/0120599 A1 | 5/2008 | I'Anson | |
| 2008/0186845 A1 | 8/2008 | Maes | |
| 2008/0270614 A1 | 10/2008 | Stumpert et al. | |
| 2009/0030986 A1* | 1/2009 | Bates | 709/205 |
| 2009/0040923 A1 | 2/2009 | Bantukul et al. | |
| 2009/0222506 A1* | 9/2009 | Jeffery et al. | 709/202 |
| 2009/0222842 A1* | 9/2009 | Narayanan et al. | 719/328 |
| 2010/0318616 A1 | 12/2010 | Langley et al. | |
| 2011/0113247 A1 | 5/2011 | Panasyuk et al. | |
| 2011/0314165 A1 | 12/2011 | Maes et al. | |
| 2012/0011207 A1 | 1/2012 | Morris | |
| 2012/0034941 A1 | 2/2012 | Sendrowicz | |

OTHER PUBLICATIONS

U.S. Appl. No. 11/670,150, filed Feb. 1, 2007, Final Office Action mailed Jan. 11, 2011, 20 pages.
U.S. Appl. No. 12/948,063, filed Nov. 17, 2010, Non-final Office Action mailed Nov. 7, 2012, 20 pages.
U.S. Appl. No. 11/670,150, filed Feb. 1, 2007, Advisory Action mailed Mar. 30, 2011, 2 pages.
U.S. Appl. No. 11/670,150, filed Feb. 1, 2007, Office Action mailed May 25, 2010, 17 pages.
Sun Microsystems, *JAIN and Open Networks*, Aug. 2003, 8 pages.
Sun Microsystems, *Jain Technology: Serving the Developer Community*, Jul. 28, 2004, http://web.archive.org/web20040728172200/http://java.sun.com/products/jain/jain0503.pdf, 69 pages.
Bossche et al., "*J2EE-based Middleware for Low Latency Service Enabling Platforms*", IEEE Globecon 2006 Global Telecommunications Conference, Dec. 1, 2006, 7 pages.
Sun Microsystems, "*JAIN: Integrated Network API's for the Java Platform*", Nov. 2000, 23 pages.
Sun Microsystems, "*A SLEE for All Seasons*", Mar. 4, 2003, 15 pages.
Sun Microsystems, "JAIN and Java in Communications", Mar. 2004, 14 pages.
Open Mobile Alliance, "OMA Service Environment", Mar. 8, 2005, 35 pages.
Lim et al., JAIN SLEE 1.0 Specification, Jan. 30, 2004, https://cds.sun.com/is-bin/INTERSHOP.efinity/WFS/CDS-CDS_JCP-Site/en_US/-/USD/ViewFilteredProducts-SimpleBundleDownload, 299 pages.
U.S. Appl. No. 12/948,063, filed Nov. 17, 2010, Final Office Action mailed Aug. 8, 2013, 15 pages.
U.S. Appl. No. 12/948,063, filed Nov. 17, 2010, Non-final Office Action mailed Apr. 17, 2013, 11 pages.
U.S. Appl. No. 12/948,063, filed Nov. 17, 2010, Notice of Allowance mailed Nov. 8, 2013, 10 pages.

* cited by examiner

HIGH AVAILABILITY ENABLER

CROSS-REFERENCE TO RELATED APPLICATIONS

This application is related to and claims the benefit of U.S. Provisional Patent Application No. 61/180,998 filed May 26, 2009 by Maes and entitled "High Availability Enabler" of which the entire disclosure is incorporated herein by reference for all purposes.

BACKGROUND OF THE INVENTION

Embodiments of the present invention relate generally to methods and systems for providing high availability processes and more particularly to a high availability enabler for abstracting underlying session technologies.

High availability of a process such as an application supporting a communication session is achieved by replicating the session between nodes of a cluster so that if one node fails or otherwise becomes unavailable, another node can take over support of that session. An example of such replication is the group processing provided by JGroups technology toolkit in JEE middleware. In this and other systems, the session and application level data is replicated on multiple nodes of a cluster using different strategies, e.g., reliable multicast etc, unicast, and different replications (one-to-two, one-to-n, etc.). Upon failure of the node supporting the session detected via different means like hardware failure detection or middleware monitoring (e.g. via heart beat), the session is switched to one of the other nodes on which the session is replicated, e.g., network resources are informed of the failure and switch to the other nodes. Since the session, including the application level data, is replicated on the other node, the session can be rebuilt and resumed on the other node. This is often referred to as service/application availability in that as soon as a failure occurs, the service or application is again available for new transactions, sessions, calls, etc.

Another approach to providing high availability is demonstrated in Oracle Coherence that uses a distributed cache that can replicate sessions in a replica of the cache in a grid computing environment (i.e. set of nodes). Accordingly, the data of the session can be also stored in the cache, distributed by Coherence and replicated by Coherence so that it is where needed for active session and it is provided to another activated session that needs it if the first session is no longer available.

However, existing approaches to providing high availability processes are limited in that they do not factor out or abstract the underlying technologies. That is, applications interacting with, using, and/or relying on such high availability processes are developed specifically for and based one the technology used to provide the replication and/or other high availability functions as well as the protocols supporting each session. As a result, the existing solutions are either limited to use with only one network protocol and/or technology or difficult to expand to allow integration with other capabilities. Hence, there is a need for improved methods and systems for interacting with high availability sessions.

BRIEF SUMMARY OF THE INVENTION

Embodiments of the invention provide systems and methods for interacting with a high availability session. According to one embodiment, a method of providing high availability can comprise abstracting one or more functions of a high availability infrastructure via a high availability enabler and providing access to the abstracted one or more functions via a northbound interface of the high availability enabler. For example, the one or more functions of the high availability infrastructure can comprise session control, either synchronous session control or asynchronous session control, concurrency management, data distribution, e.g., possibly including storing at least some of the data local to the high availability enabler, caching, session replication, providing fault tolerance, providing predictable latencies, etc. The high availability infrastructure can comprise, for example JGroups, Oracle Coherence, or another high availability infrastructure and combinations of these technologies. The method can include decoupling application level processing from protocol level processing via the high availability enabler.

In some cases, a request to perform one or more session actions can be received from an application via the northbound interface of the high availability enabler. Receiving the request to perform one or more session actions from the application can comprise receiving the request from a bus or any other distributed messaging infrastructure. The northbound interface can provide an abstract interface for interacting with the high availability infrastructure. The one or more functions can be requested from the high availability infrastructure via a southbound interface of the high availability enabler. The southbound interface can provide an interface specific to the high availability infrastructure. According to one embodiment, prior to requesting the one or more functions from the high availability infrastructure, one or more policies can be applied to the request. For example, the one or more policies can comprise concurrency management policies, e.g., in which order/how the events received from the high availability infrastructure are treated such as queued with first-in-first-out processing etc.

In other cases, a notification or any other type of event can be received from the high availability infrastructure via the southbound interface of the high availability enabler. Receiving a notification from the high availability infrastructure can comprise receiving the request from a bus or any other distributed messaging infrastructure. Information related to the notification can be provided to the application via the northbound interface of the high availability enabler. According to one embodiment, prior to providing information related to the notification to the application, one or more policies can be applied to the request. For example, the one or more policies can comprise concurrency management policies. In one implementation, the northbound interface of the high availability enabler can comprise an Application Program Interface (API). The one or more session actions can comprise retrieving session data, changing session data, storing session data, persisting session data, distributing session data, creating a new session, locking the session, retrieving a session status, retrieving a session identifier, linking a session, etc. so that an application can create data, store data, get event/updates to that data in a way that is highly available while not considering from the application point of view how that is achieved.

According to another embodiment, a high availability enabler can comprise an abstraction layer including one or more northbound interfaces providing an abstract interface for invoking one or more high availability functions and one or more enabler instances specific to an underlying high availability technology providing the one or more high availability functions. The high availability enabler can be adapted to receive a request to perform one or more actions from an application via the northbound interface and request the one or more actions via at least one or the enabler instances.

Receiving the request to perform one or more session actions from the application can comprise receiving the request from a bus or other messaging infrastructure. In some cases, the high availability enabler can apply one or more policies to the request prior to requesting the one or more functions from the high availability infrastructure. For example, the one or more policies comprise concurrency management policies.

Additionally or alternatively, the high availability enabler can be adapted to receive data via the southbound interface and provide the data to an application via the northbound interface. Receiving a notification from the high availability infrastructure can comprise receiving the request from a bus. In some cases, the high availability enabler applies one or more policies to the request prior to providing information related to the notification to the application. For example, the one or more policies comprise concurrency management policies.

The high availability enabler can include at least one of the one or more enabler instances comprising a southbound interface. For example, the southbound interface can comprise an interface to a session. In another example, the southbound interface can comprise an interface to a protocol. Additionally or alternatively, at least one of the one or more enabler instances can comprise an adapter. In some cases, the adapter can comprise a stateless adapter.

DETAILED DESCRIPTION OF THE INVENTION

Figure 1:
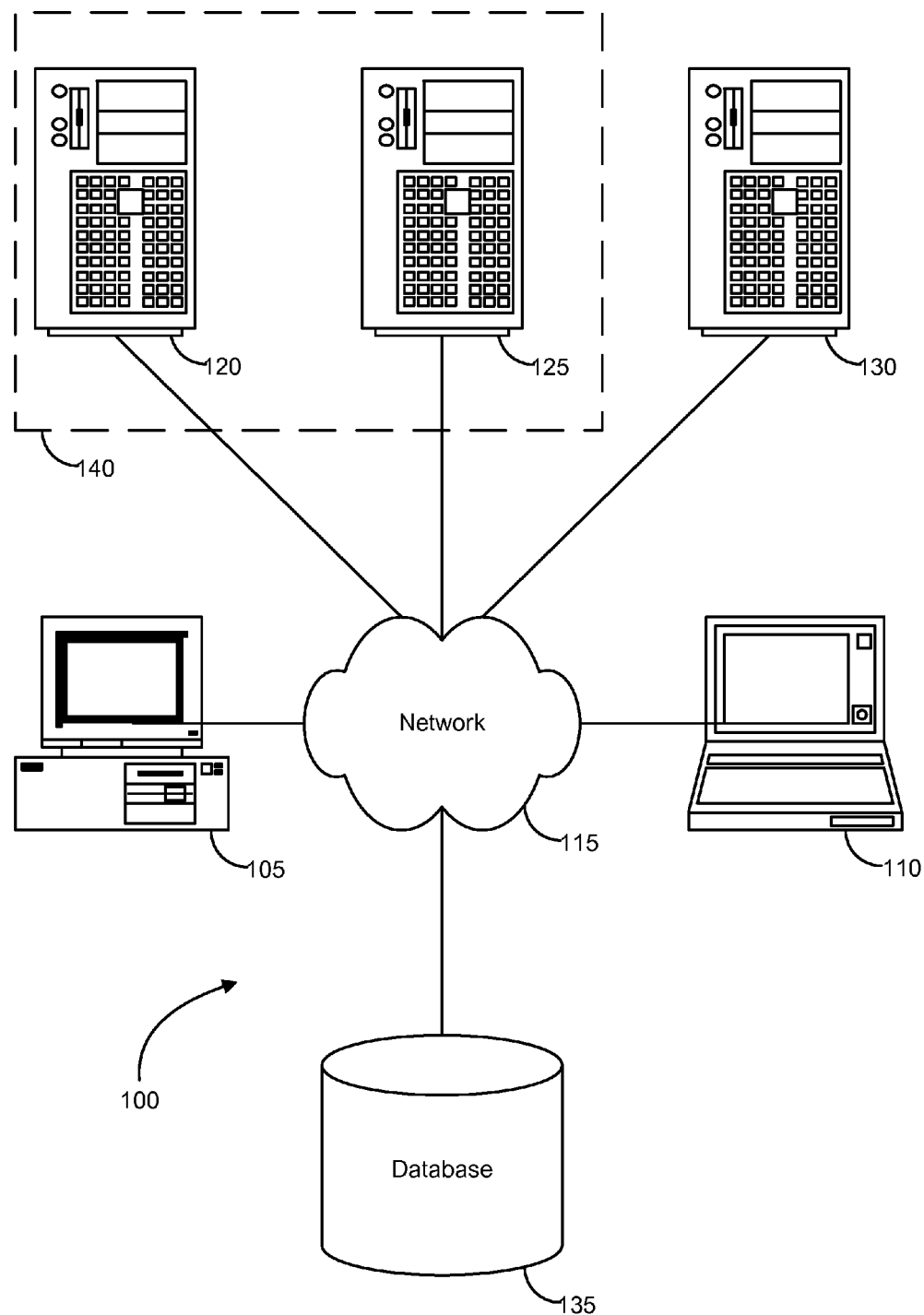
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for supporting a high availability session. More specifically, embodiments of the present invention include a high availability enabler for invoking or interacting with various high availability functions, session actions, and/or session data in a way that is abstracted from the underlying technologies supporting the session and concurrency of events to and from southbound adapters, resources, protocols, etc. to provide for and support passing of events from southbound adapters of the enablers to the applications and conversely from the application to the southbound adapters. As used herein, the term enabler refers to a reusable service layer component or components that provide a function (preferably intrinsic) for use by others (other enablers, applications (i.e. services) or any authorized resource) through appropriate northbound interfaces. Intrinsic means that an enabler does not itself provide functions provided by other enablers nor functions based on service provider policies. An enabler accesses the high availability functions, session, and/or data via any mechanism appropriate for the session. That is, a southbound interface is not specified as part of the adapter, so it can be changed from resource to resource. However, northbound interfaces provided by an enabler may be standardized.

More specifically, the high availability enabler can provide an abstraction of a high availability infrastructure for supporting the session(s) of the applications, enablers, southbound adapters/protocols and the handling of the southbound events (inbound and outbound). Through this abstraction, an application or service can interact with the session, request session actions or functions provided by the high availability infrastructure, receive notification of and respond to events or updates of the session, etc. Functions or features of the high availability infrastructure that can be abstracted by the high availability enabler can include but are not limited to synchronous and/or asynchronous session control that can include, for example, thread management, locking/unlocking or queuing of events, etc., data distribution and/or management, session replication, etc. These various features can be implemented by any of a number of different high availability infrastructures including but not limited to JGroups, Oracle Coherence, and other technologies. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems), smartphones, PDAs, Set top box and other computing devices. These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, HSDPA, WiMAx, etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
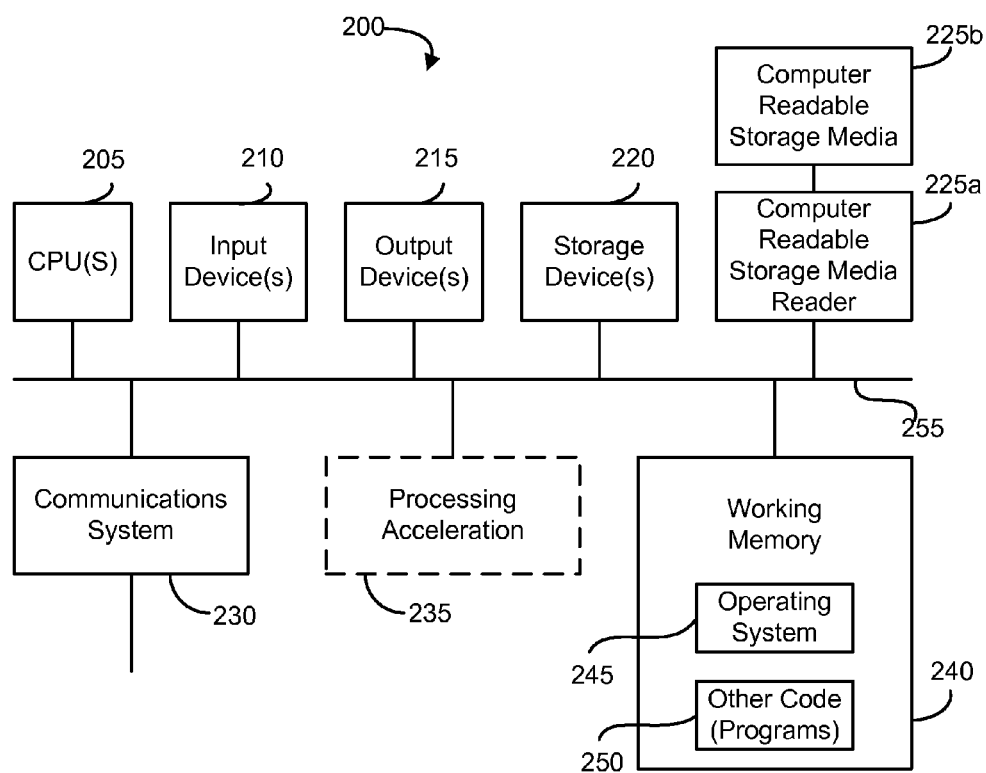
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
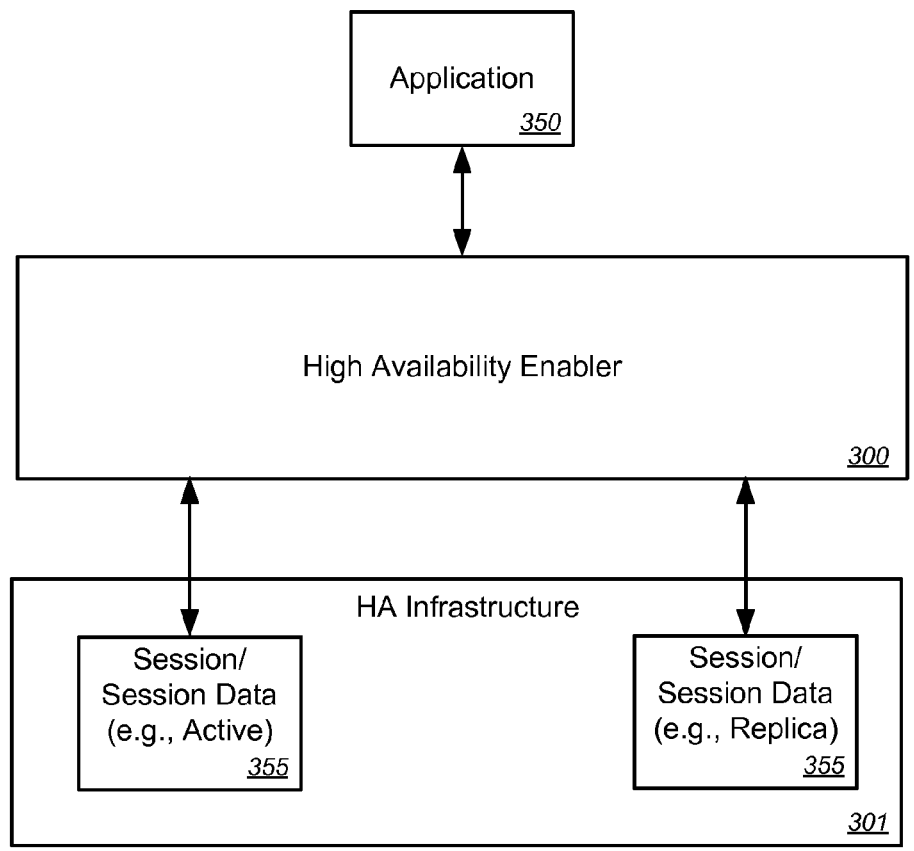
FIG. 3 is a block diagram conceptually illustrating use of a high availability enabler according to one embodiment of the present invention.

FIG. 3 is a block diagram conceptually illustrating use of a high availability enabler according to one embodiment of the present invention. As illustrated here, a high availability infrastructure 301 can support one or more sessions and/or sets of session data 355 and 360. For example, one session 360 can be a replica of a currently active session 355 as known in the art. The high availability infrastructure 301 can comprise, for example, a JGroups, Oracle Coherence, or other high availability mechanism(s). It can also be a reliable messaging system, e.g., ESB and reliable Message Oriented Middleware (MOM) where session-ful or session-less messages can be reliably exchanged. These can also be queued with rules for concurrency/queue handling.

A high availability enabler 300 can be adapted to abstract one or more functions of the high availability infrastructure 301 and provide access to the abstracted one or more functions via a northbound interface of the high availability enabler 300 to an application 350, service, or other element including but not limited to high availability, caching, distribution, event concurrency, threading management, messaging (e.g., synchronous) etc. For example, the one or more functions of the high availability infrastructure 301 can comprise but are not limited to synchronous or asynchronous session control or messaging, data distribution, including storing at least some of the data local to the high availability enabler 300, session replication, persistence, and/or other high availability functions. According to one embodiment, the high availability enabler 300 can be adapted to decouple application level processing from protocol level processing as described in U.S. patent application Ser. No. 12/948,063 filed Nov. 17, 2010, now U.S. Pat. No. 8,688,816 issued Apr. 1, 2014, by Maes and entitled "High Availability by Letting Application Session Processing Occur Independent of Protocol Servers" the entire disclosure of which is incorporated herein by reference for all purposes. According to one embodiment, the high availability enabler 350 can be adapted to achieve predictable, low latencies according to the embodiments described in U.S. patent application Ser. No. 11/951,500 filed Dec. 6, 2007 by Maes and entitled "Achieving Low Latencies on Network Events in a Non-Real Time Platform" and U.S. patent application Ser. No. 11/670,150 filed Feb. 1, 2007 by Maes and entitled "Staging Latency Performances and Orchestrating Network Resources with Low Latency Requirements" of which the entire disclosure of each is incorporated herein by reference for all purposes.

As a result, the high availability enabler 300 can abstract or hide the underlying technologies from the application 350 and application developer. In some cases, the high availability enabler 300 can abstract the fact that there may be different ways to control the sessions 355 and 360, e.g., synchronous and asynchronous, and present one model to the application 350 while adapting to the other model.

Figure 5:
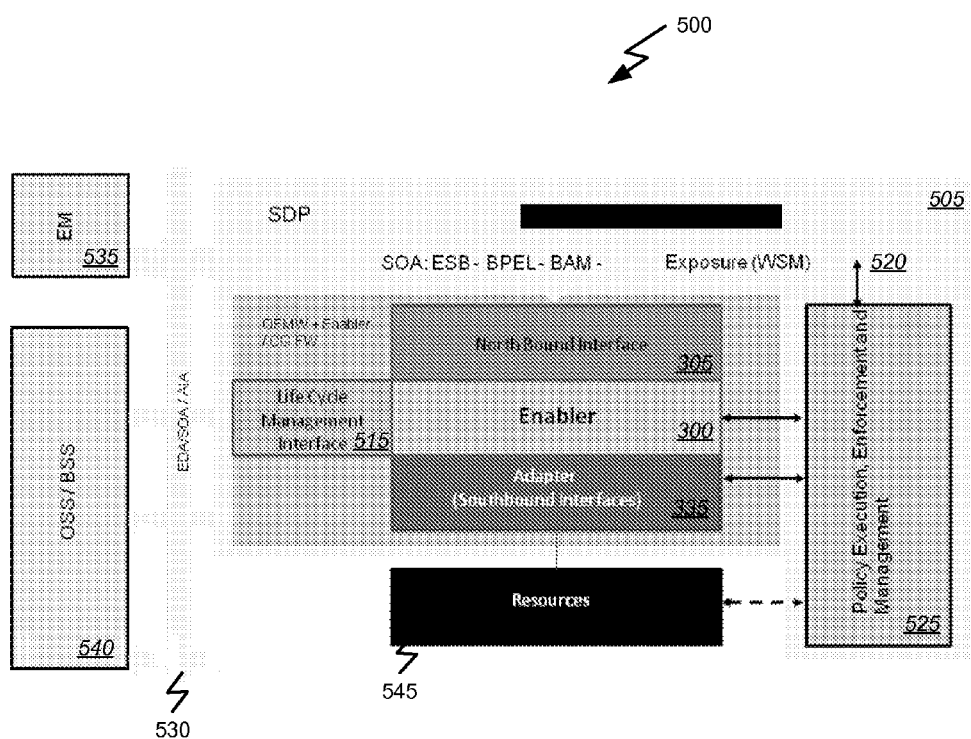
FIG. 5 is a block diagram illustrating a high availability enabler in the context of a system according to an exemplary embodiment of the present invention.

For example, FIG. 5 is a block diagram illustrating a high availability enabler in the context of a system according to an exemplary embodiment of the present invention. In this example, the system 500 includes a high availability enabler 300 as introduced above. The high availability enabler 300 can include a northbound interface 305 that abstracts one or more functions of resources 545 of a high availability infrastructure as described above and provide access to the abstracted one or more functions. The high availability enabler 300 can also include one or more adapters or southbound interfaces 335. The southbound interfaces 335 can be adapted to communicate in the protocol supported by the resources 545, e.g., SIP, HTTP, Diameter, or other Intelligent Networking (IN) protocol including but not limited to Transaction Capabilities Application Part (TCAP), Intelligent Network Application Part (INAP), Customized Applications for Mobile Enhanced Logic (CAMEL), CAMEL Application Part (CAP), etc. Additionally or alternatively, the southbound interfaces 335 can support different types of sessions 355-360. For example, one or more of the high availability can be supported by JGroups, Oracle Coherence, or other high availability infrastructure for providing replication between sessions. In another example, one or more of the high availability sessions can be supported by Oracle Coherence for providing data persistence. Reliable messaging can be provided by ESB, reliable MOM, MQSeries, etc.

As noted, the high availability enabler 300 can abstract or hide the underlying technologies from the resources 350. That is, the high availability enabler 300 can communicate and/or interact with the resources 545 in a protocol appropriate to those resources 545 via the adapters or southbound interfaces and provide access to those resources in a manner abstracted from the underlying protocols or technologies of those resources 545 via the northbound interface 305. This abstraction and other actions of the high availability enabler 300 can be controlled or affected by a life cycle management interface 515 and/or one or more policies applied by policy execution, enforcement, and management module 535.

According to one embodiment, the enabler 300 can be implemented as part of a Service Delivery Platform (SDP) 505 such as described, for example, in U.S. patent application Ser. No. 11/357,653, filed Feb. 16, 2006, by Maes and entitled "Factorization of Concerns to Build a SDP (Service Delivery Platform)" of which the entire disclosure is incorporated herein by reference for all purposes. As noted therein, the SDP 505 can include an Enterprise Service Bus (ESB) 520. In such cases, the high availability enabler 300 can be adapted to communicate with or through the ESB 520 via the northbound interfaces 305 of the enabler 300. That is, the high availability enabler 300 can be adapted to place abstracted notifications or other information from the resources 545 or events thereof on the ESB 520 via the northbound interface 305. Additionally or alternatively, the northbound interface 305 of the enabler 300 can receive instructions and/or other information from other elements of the system 500 from the ESB 520.

For example, ESB 520 coupled with/implemented as part of Event Driven Architecture (EDA) as described, for example, in U.S. patent application Ser. No. 12/045,220 filed Mar. 10, 2008 by Maes and entitled "Presence-Based Event Driven Architecture" the entire disclosure of which is incorporated herein by reference for all purposes. ESB can also be based on traditional enterprise service buses, e.g., Oracle Service Bus, or reliable messaging systems/MOMs or queues. As noted therein the EDA can also include or be coupled with a management system (e.g., Oracle Enterprise Manager) 535 and/or other application as well as 686 and Operation Support Systems/Business Support Systems (OSS/BSS) 540. In use, events or information from the resources 545 can come in from the adapters 335 and be placed on the bus/ESB 520 (perhaps after concurrency management and/or queue provided by the HA enabler) by the northbound interface 305 of the enabler 300). The events can then be distributed to a target listener (e.g., the event monitor 535 or other registered application(s) if any). In between the events may be managed, for example based on policies enforced by policy execution, enforcement, and management module 525 to order the events with a strategy, e.g., a concurrency strategy, that decides when multiple events are to be processed, who and when they are put on the bus 520, how the bus 520 processes them and how the listeners process them etc.

The SDP 505 can provide high availability and scalability, for example, by employing techniques applied to the J2EE execution environment, providing carrier grade J2EE as outlined above. These techniques include but are not limited to application server clustering, i.e., making a number of application servers work as one in a cluster, enabling scalability and availability, database RAC, i.e., providing horizontal scalability in the data management layer, JGroups, i.e., providing for low latency replication of session state in a cluster, in memory datastores such as TimesTen, a SQL based in-memory datastore that can act as a cache, providing protocol aware load-balancing in HTTP/SIP, providing partitioning of data, geographical redundancy, predictable low latency on network events, portability, queuing (with concurrency management) and distributed event distribution messaging, etc. The SDP can also be hot-pluggable, supporting multiple host application servers. Additionally or alternatively, the SDP can be adapted to ensure predictable low latencies on southbound events as described, for example in U.S. patent application Ser. No. 11/670,150 filed Feb. 1, 2007 by Maes and entitled "Staging Latency Performances and Orchestrating Network Resources with Low Latency Requirement" and U.S. patent application Ser. No. 11/951,500 filed Dec. 6, 2007 by Maes and entitled "Achieving Low Latencies on Network Events in a Non-Real Time Platform" of which the entire disclosure of each is incorporated herein by reference for all purposes.

Returning to FIG. 3, the high availability enabler 300 can be built, for example, on an asynchronous infrastructure 301 (e.g., event based) and can link or use and abstract the underlying mechanisms for the sessions 355 and 360 such as locking etc. and abstract it. The application 350 can declare (or be provided) a session as asynchronous (session can be one event, i.e., session-less). In such case, updates can be done asynchronously and notifications of updates can be received asynchronously. Asynchronous events and updates can be managed. As noted, a concurrency strategy can be implemented or provided to handle how the different events are passed and when etc the event/information is available.

On a synchronous infrastructure 301, the high availability enabler 300 can lock other related/coordinated sessions (e.g. sessions involved in a same application like: HTTP, SIP, Diameter, Adapter session of enablers, enabler sessions, WS API for northbound enablers, Application sessions etc), do the update, then provide a notification when the update is done. Such enablers and session processes are described, for example, in U.S. patent application Ser. No. 11/949,930 filed Jan. 4, 2008 by Maes and entitled "Call Control Enabler Abstracted from Underlying Network Technologies" and U.S. patent application Ser. No. 12/831,603 filed Jun. 7, 2010, by Maes and entitled "Protocol Level Communications for Protocol Level Composition with Session Sharing" of which the entire disclosure of each is incorporated herein by reference for all purposes.

As noted, the high availability enabler 300 can provide replication of sessions 355 and 360 and because the concurrencies and the event handling can be managed, it is possible to provide high availability on the session and to know which events are processed and which are still to be processed by a recovered session. Also, the manager can change priority to process some events faster, raise priorities if a delay or other condition of a Service Level Agreement (SLA) may not be respected, and/or raise alarms if events are delayed beyond a given time. Other policies can be enforced by the manager and by the bus. The high availability enabler 300 may implement Oracle Coherence mechanisms, JGroup mechanisms with clustering or implement, for example, the embodiments disclosed in the application entitled "High Availability by Letting Application Session Processing Occur Independent of Protocol Servers" referenced above. In general again, the high availability enabler 300 abstracts these behaviors/implementations and may itself expose different behavior northbound (selected by design, setup/configuration, implementation etc.).

Other features that can be provided by high availability enabler 300 can involve abstraction of caching by providing a way to abstract access (e.g. TopLink) to the cache, versus distributed cache a la Oracle Coherence, versus embedded database versus a database. The high availability enabler 300 can provide/distribute caching, local persistence for fast service high availability (fast recovery), etc. In some cases, the high availability enabler 300 can abstracting geographical redundancy, i.e., the high availability enabler 300 can provide/support ways to replicate data and sessions locally or geographically remote. As noted, the high availability enabler 300 can be implemented to provide predictable low latencies as described in the referenced applications entitled "Achieving Low Latencies on Network events in a Non-Real Time Platform" and "Staging Latency Performances and Orchestrating Network Resources with Low Latency Requirements" and may additional or alternatively perform deterministic garbage collection etc. In some cases, the high availability enabler 300 can provide a virtual machine layer that provides deterministic garbage collection a la JRockit for applications above whatever is the virtual machine as can be done for other environments. Therefore, high availability as provided by the high availability infrastructure 301 can be abstracted and services thereof can be provided to application 350 to exploit. For example, this provides the capability to offer to the application 350 a way to store data, state information etc. in a way that is fault tolerant. Additionally or alternatively, this approach allows the application 350 to get southbound input and output events through the high availability infrastructure 301 in a way that provides concurrency and/or thread management capabilities that can be customizable.

Figure 4A:
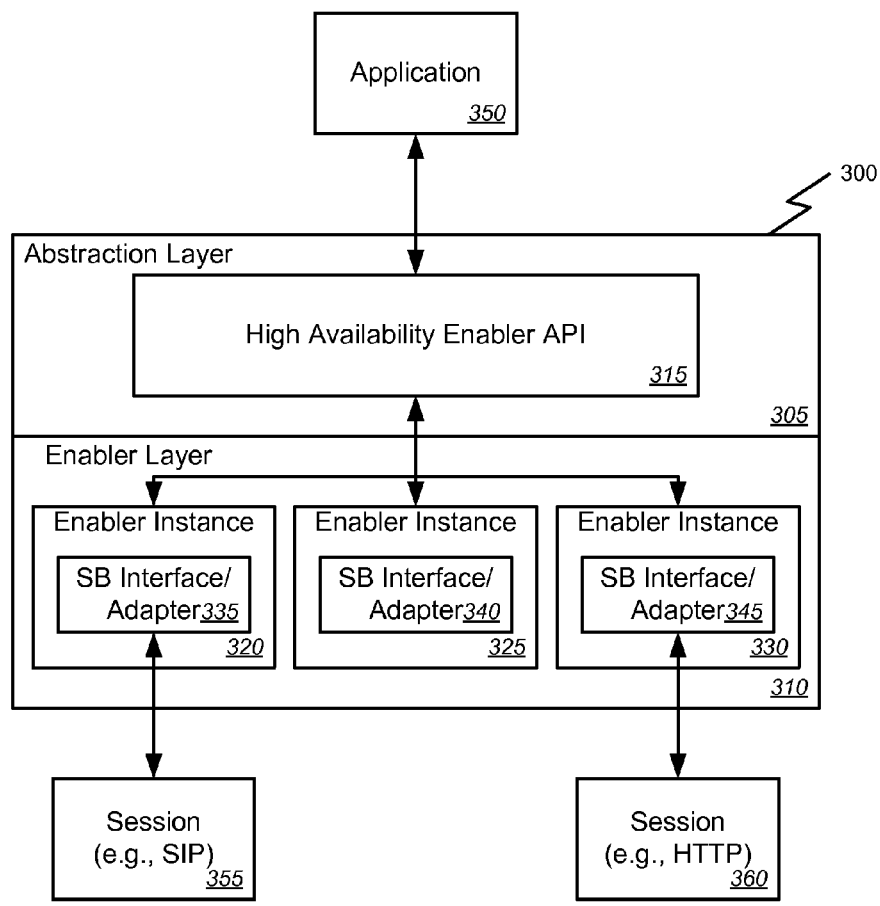
FIGS. 4A-4C are block diagrams illustrating functional components of a high availability enabler according to various embodiments of the present invention.
Figure 4B:
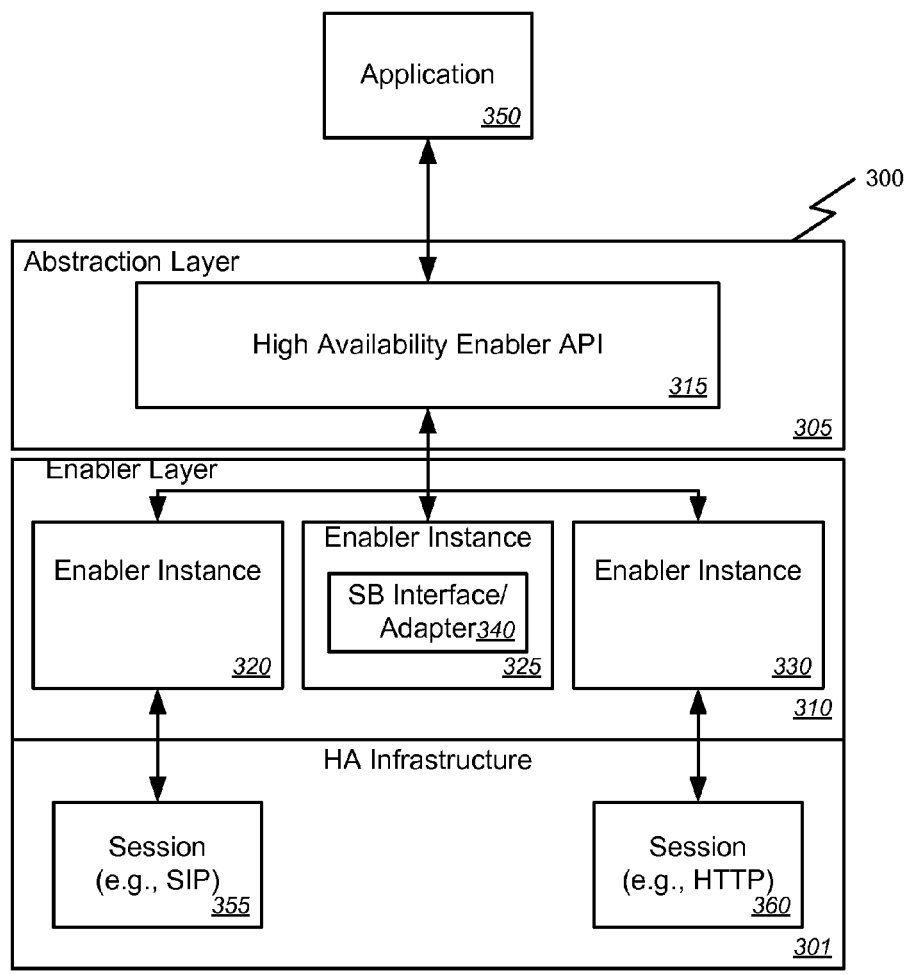
Figure 4C:
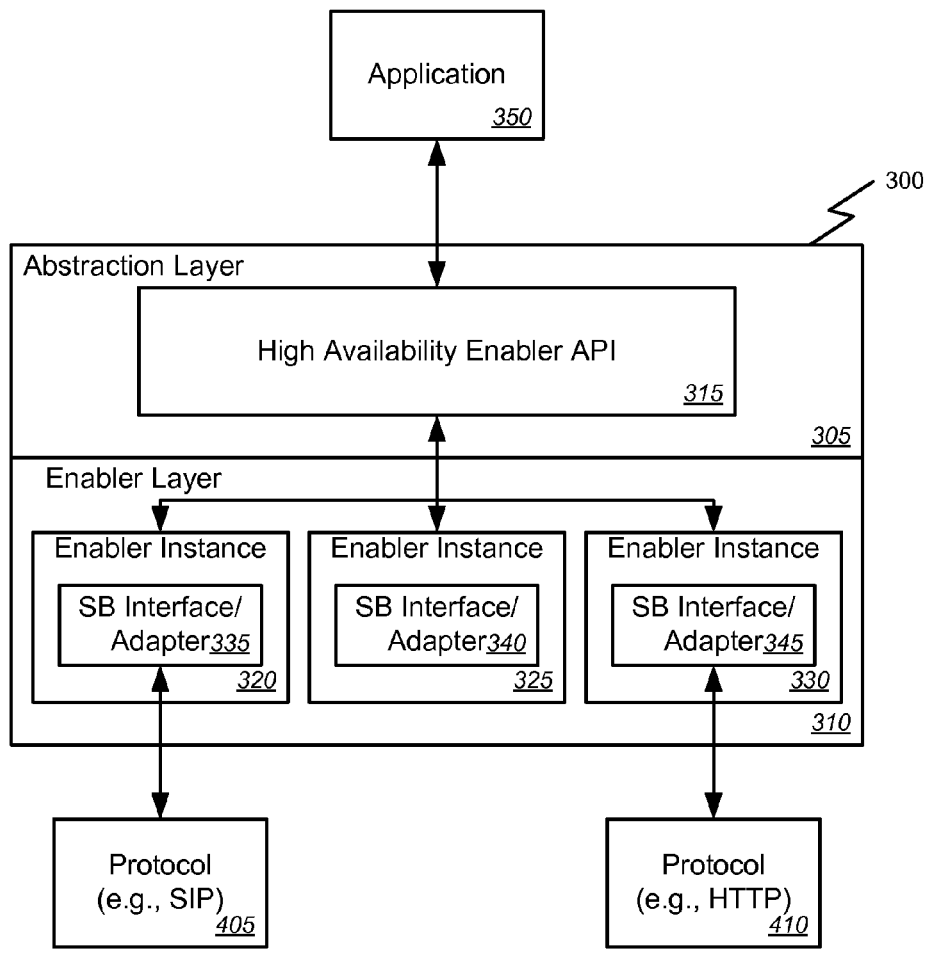

FIGS. 4A-4C are block diagrams illustrating functional components of a high availability enabler according to various embodiments of the present invention. As illustrated in FIG. 4A, a high availability enabler 300 can comprise an abstraction layer 305. The abstraction layer 305 can include one or more northbound interfaces 315 providing an abstract interface for providing session data of one or more high availability sessions 355 and 360 and invoking actions of the one or more high availability sessions 355 and 360. The northbound interface 315 of the high availability enabler 300 can comprise, for example, an Application Program Interface (API) bound to specific technologies (e.g. WS, java, C++, C, C#) or protocols (e.g. SIP, etc.).

The high availability enabler 300 can also comprise an enabler layer 310 with one or more enabler instances 320-330. Each of the one or more enabler instances 320-330 can provide a southbound interface 335-345 providing an interface specific to at least one of the high availability sessions 355 and 360. For example, the high availability sessions 355 and 360 may be supported by one or more communication protocols such as Session Initiation Protocol (SIP), Hyper-Text Transfer Protocol (HTTP), or another protocol such as Diameter via southbound adapters as described in the application referenced above entitled "Call Control Enabler Abstracted from Underlying Network Technologies." Also as noted above, the enabler instances 335-345 can be implemented according to various embodiments of the referenced applications entitled "Protocol Level Communications for Protocol Level Composition with Session Sharing," "Achieving Low Latencies on Network events in a Non-Real Time Platform," and "Staging Latency Performances and Orchestrating Network Resources with Low Latency Requirements."

The southbound interfaces 335-345 can be adapted to communicate in the protocol supported by the session(s) corresponding to that instance. For example, one instance 320 can be specific to a session 355 supported by SIP while another instance 330 is specific to a session 360 supported by HTTP or Diameter or other Intelligent Networking (IN) protocol including but not limited to Transaction Capabilities Application Part (TCAP), Internet Message Access Protocol (IMAP), Customized Applications for Mobile Enhanced Logic (CAMEL), etc. Additionally or alternatively, the instances 335-345 can support different types of sessions 355-360. For example, one or more of the high availability sessions 355 and 360 can be supported by JGroups, Oracle Coherence, or other high availability infrastructure for providing replication between sessions. In another example, one or more of the high availability sessions 355 and 360 can be supported by Oracle Coherence for providing data persistence. In yet another example, one or more of the high availability sessions 355 and 360 can be supported by various database systems for providing replication, persistence, etc. Thus, the instances 320-330 and southbound interfaces 335-345 of each can be specific to the protocols and/or technologies of each session 355 and 360.

While the sessions 355 and 360 are illustrated in FIG. 4A as being external to the enabler 300 and any other infrastructure, it should be understood that such an implementation is not required. Rather, as illustrated in FIG. 4B, the session may be provided "internal" to a high availability infrastructure 301 of which the enabler 300 is a part and access via an enabler instance of that infrastructure 301 instead of via southbound interface to an external session. Additionally or alternatively, one or more adapters 340 may exist without a session, i.e., adapters can be stateless.

It should be understood that other variations are contemplated and considered to be within the scope of the present invention. For example, while described herein with reference to supporting or interacting with a session, it should be understood that in other implementations, no session may exists. That is, as illustrated in FIG. 4C the high availability enabler 300 can include one or more protocol adapters/southbound interfaces 335 and 345 to get/send protocol events specific to various protocols 405 and 410. These protocols 405 and 410 may or may not have "sessions."

Regardless of the exact implementation, the high availability enabler 300 can be adapted to receive a request to perform one or more high availability functions or session actions from an application 350 via the northbound interface 315 and request the one or more functions or action from the high availability infrastructure or one of the high availability sessions 355 and/or 360 via the southbound interface 335 and/or 345 specific to the infrastructure or session. In such a case, the high availability enabler 300 can be further adapted to receive a notification and/or session data from the infrastructure or session, i.e., resulting from the function or action, via the southbound interface 335 and/or 345 and return the notification or data to the application 350 via the northbound interface 315.

Additionally or alternatively, the high availability enabler 300 can be adapted to receive a notification or session data or another event from the high availability infrastructure and/or one of the high availability sessions 355 and/or 360 via the southbound interface 320 and/or 345 specific to the infrastructure or session and notify the application 350 via the northbound interface 315. In such a case, the application 350 can be adapted to determine one or more actions to be performed in response and request the one or more actions via the northbound interface 315 of the high availability enabler 300. That is, rather than initiating actions, the application 350 can be adapted to receive session data and/or notifications via the enabler 300 and respond thereto by requesting further actions.

Therefore, the high availability enabler 300 can be used an application 350 such as a event monitor or other listener or other application for monitoring, invoking and/or interacting with various high availability functions, session actions, session data, protocols, etc. in a way that is abstracted from the underlying protocols or technologies. The high availability enabler 300 can also be adapted to provide concurrency of events to and from southbound adapters, resources, protocols, etc. to provide for and support passing of events from southbound adapters of the enablers to the applications and conversely from the application to the southbound adapters. In other words, northbound events or information from the resources, protocols, and/or sessions can be passed to the high availability enabler via an appropriate adapter. The high availability enabler may apply concurrency/thread management and pass the events or information to an application or other listener via the northbound interface of the enabler. Conversely, southbound events or information from the application can be passed to the high availability enabler via the northbound interface of the enabler. The enabler can apply a concurrency strategy to the event or information and pass the events or information to the resources, protocols, and/or sessions via the appropriate southbound interface or adapter.

Functions supported or provided by a high availability enabler as described herein can include any of a variety of functions and/or services provided by various high availability infrastructures and systems. Furthermore, since the enabler can be adapted to support various different underlying protocols, technologies etc. by providing a southbound interface or adapter to that specific technology, different, even future, protocols and/or high availability infrastructures can be easily supported as well. Therefore, various exemplary functions that can be provided by a high availability enabler according to embodiments of the present invention will be described below for illustrative purposes. However, it should be understood that these functions, features, services, implementations, etc are provided by way of example only and are not intended to limit the scope of the present invention.

For example, various systems such as Oracle Fusion MiddleWare (OFMW) provide high availability features that can be supported by a high availability enabler as described herein. These high availability features can be used to support carrier grade IT technologies by providing high availability via clustering (e.g., JGROUPS) with high availability configurations. These systems provide high performance on commodity hardware that is scalable through clustering and provide predictable low latencies on network events (e.g., network event to listener in J2EE container). They can be implemented using SIP or JCA 1.5 and support JVM tuning (e.g., for heap size, garbage collection, etc) for high performance of SIP application servers.

Carrier grade J2EE also provides a high available architecture that can additionally or alternatively be supported by a high availability enabler as described herein. J2EE supports application server clustering, database Real Application Clusters (RACs) and JGROUPs. Variations of these systems can include high availability platforms using Coherence or Open Services Gateway Interactive (OSGi) for dynamic cluster re-balancing, etc. Such an infrastructure can also support or provide in-memory caching and performance (e.g., using TimesTen), horizontal scalability (e.g., including protocol aware load balancing, partitioning, efficient DB caching, etc.), predictable low latency on network events, geographical redundancy, can be hot-pluggable, etc. J2EE also provides JAIN SLEE features such as profiles, events, resources, service and life cycle management, etc.

Adaptations of these systems that can be supported by a high availability enabler as described here can additionally or alternatively include but are not limited to performance of deterministic garbage collection and/or use of Oracle Coherence for scalability, grid computing, high transactions, distributed cache, providing high availability across multiple protocols (e.g., ISP and HTTP, JCA and SIP, Diameter and SIP etc.) as described for example in U.S. patent application Ser. No. 12/948,063 filed Nov. 17, 2010, now U.S. Pat. No. 8,688,816 issued Apr. 1, 2014, by Maes and entitled High Availability by Letting Application Session Processing Occur Independent of Protocol Servers, of which the entire disclosure is incorporated herein by reference for all purposes, as well as evolution of J2EE through Java SCA and Common J and Asynchronous Beans to bring the lifecycle management and FSM capabilities, etc.

Again, these and other features and/or functions of various high availability infrastructures can be provided or supported by a high availability enabler as described herein. As described above, the high availability enabler for invoking or interacting with these various high availability functions, session actions, and/or session data can abstract from the underlying technologies supporting the session and concurrency of events to and from southbound adapters, resources, protocols, etc. to provide for and support passing of events from southbound adapters of the enablers to the applications and conversely from the application to the southbound adapters. That is, the high availability enabler can provide an abstraction of a high availability infrastructure and functions as described herein for supporting the session(s) of the applications, enablers, southbound adapters/protocols and the handling of the southbound events (inbound and outbound). Through this abstraction, an application or service can interact with the session, request session actions or functions provided by the high availability infrastructure, receive notification of and respond to events or updates of the session, etc.

Furthermore, is should be understood that such a high availability enabler can be implemented in any of a variety of different systems and/or environments without departing from the scope of the present invention. For example, as noted above, the high availability enabler as described herein can be implemented in or with a SDP as described above with reference to FIG. 5. However, since the enabler can be adapted to support various different underlying protocols, technologies etc. by providing a southbound interface or adapter to that specific technology, implementation in different systems and environments can be easily supported as well including but not limited to various implementations of clustering, grid computing, caching, etc. Therefore, various exemplary implementations according to embodiments of the present invention will be described below for illustrative purposes. However, it should be understood that these implementations are provided by way of example only and are not intended to limit the scope of the present invention.

Figure 6A:
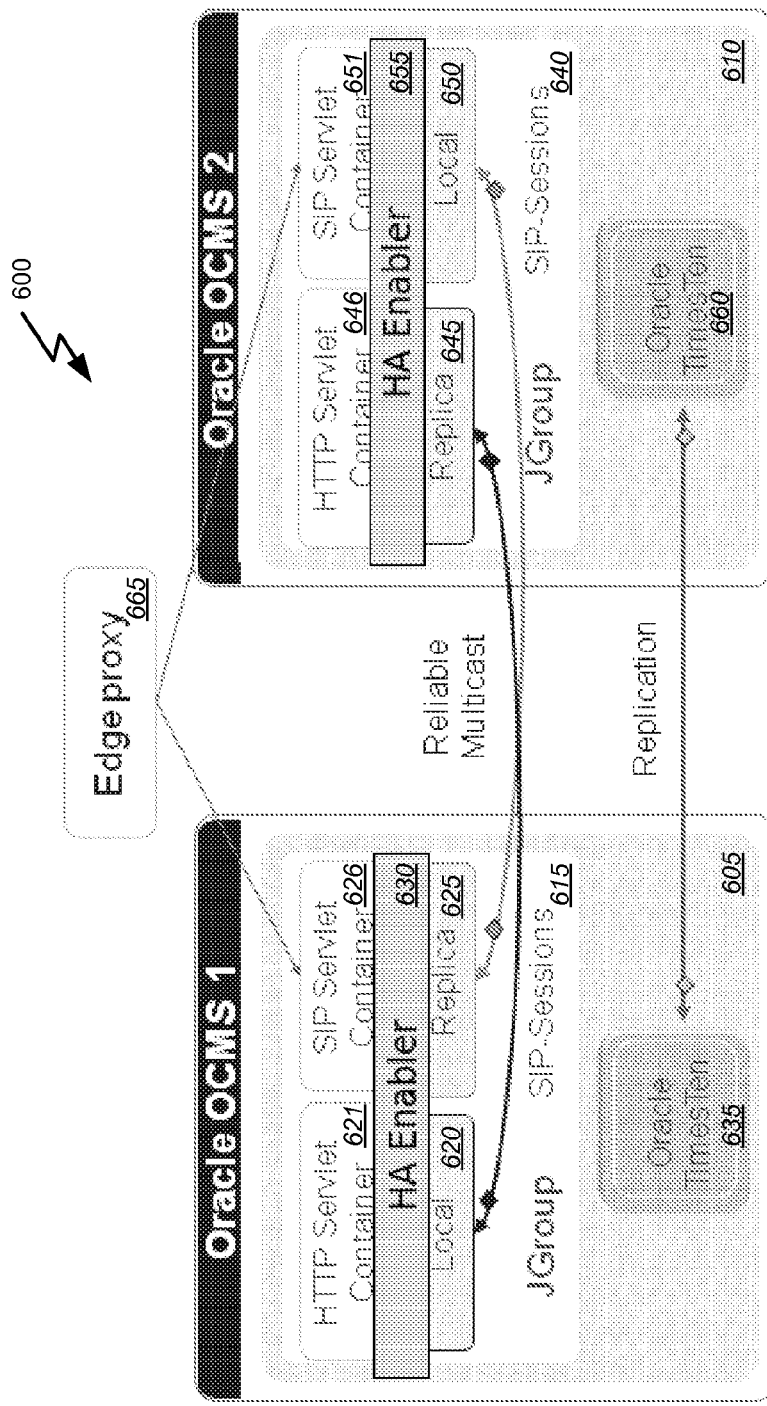
FIGS. 6A-6C are block diagrams illustrating additional details of an exemplary implementation of a high availability enabler according to one embodiment of the present invention.
Figure 6B:
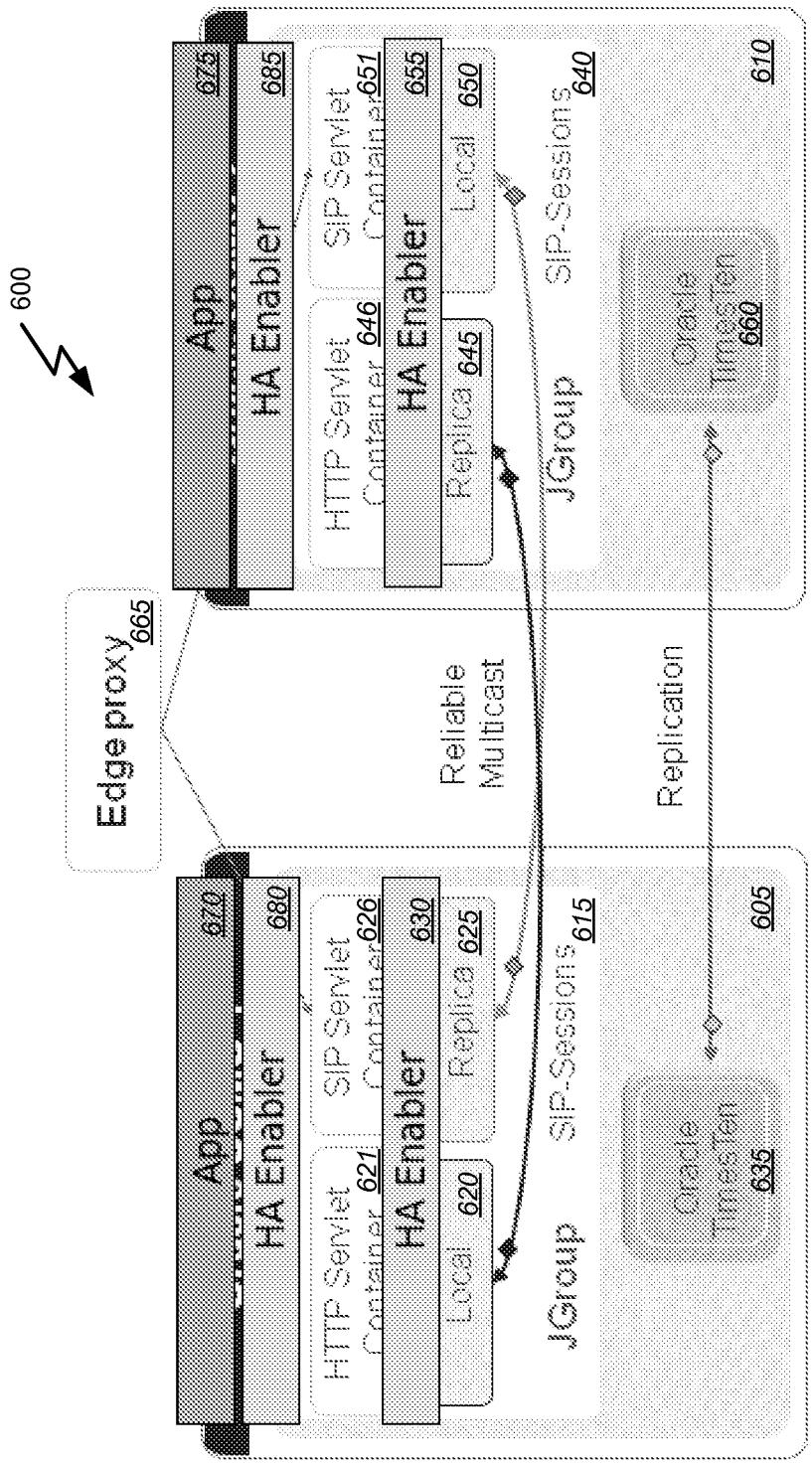
Figure 6C:
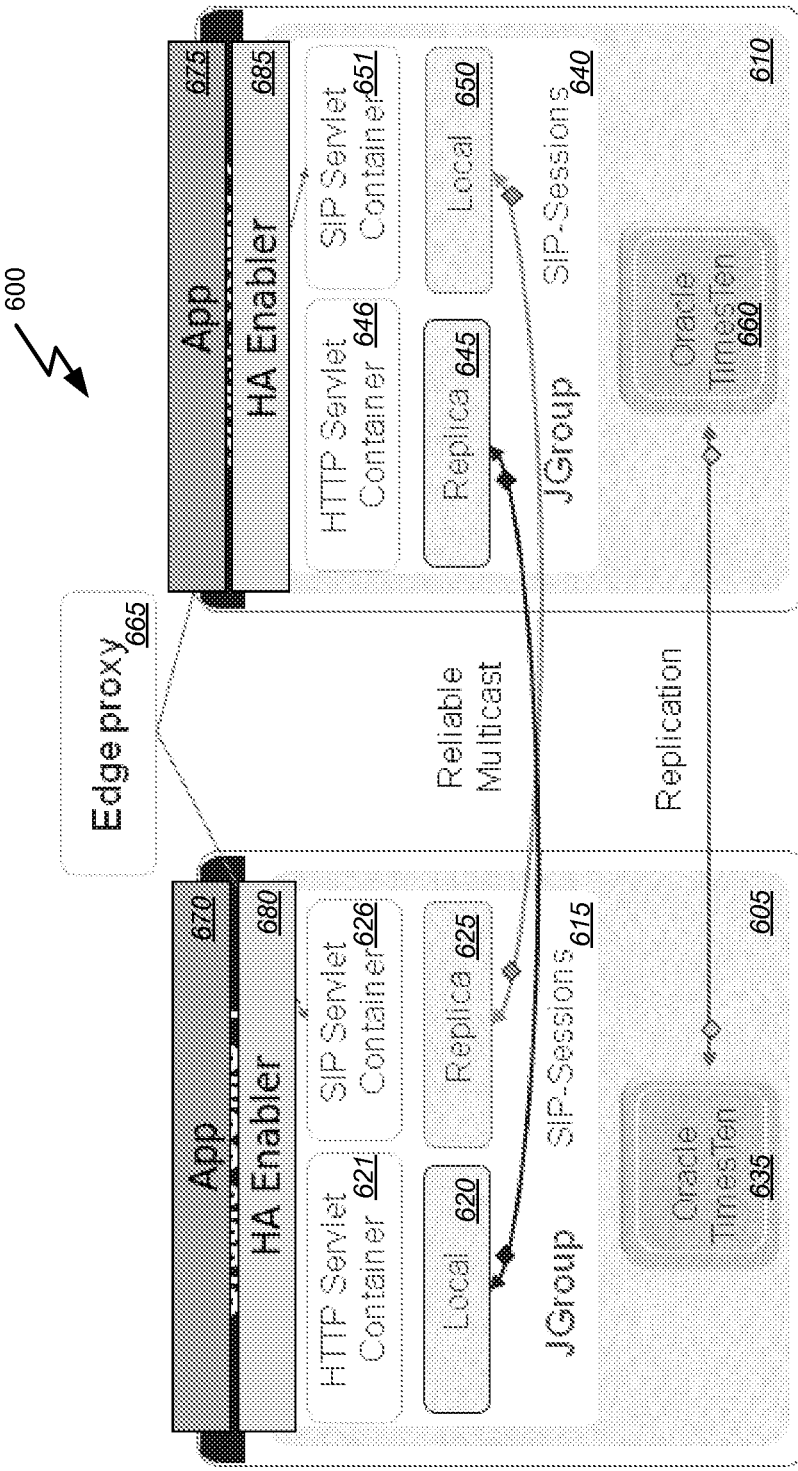

FIGS. 6A-6C are block diagrams illustrating additional details of an exemplary implementation of a high availability enabler according to one embodiment of the present invention. In this example, the system 600 includes a cluster of two servers 605 and 610, such as SIP application servers, and an edge proxy 665. It should be understood that only two servers 605 and 610 are illustrated here for the sake of clarity and brevity but in various actual implementations more servers may be utilized. For example, when deploying an SDP as a SIP Application Server, SDP may be deployed as a highly available cluster of SIP application servers. This topology may be deployed as part of an IMS network, with SDP providing highly available access to SIP-based services. This topology is useful to carriers wishing to host SIP Servlet applications.

Each server 605 and 610 can comprise a high availability infrastructure 615 and 640, e.g., via JGroups, supporting one or more sessions and an in-memory database 635 and 660 supporting the sessions. Each high availability infrastructure 615 and 640 can include an HTTP servlet 621 and 646 and SIP servlet 626 and 651. The HTTP servlets 621 and 646 and SIP servlets 626 and 651 can maintain local 620 and 650 and replica 625 and 645 copies of the session and session data. The local 620 and 650 and replica 625 and 645 copies of the session and session data can be exchange between the servers 605 and 610, for example, via a multicast. The in-memory caches 635 and 660 can also be replicated for failover and other DB access. Generally speaking, if a node failure, i.e., a failure of one of the servers 605 or 610, is detected by the edge proxy 665, the other node takes over and requests/restores the session and new transactions can be transferred to the new node. In this way geographical redundancy and cross cluster replication can be provided.

Each server 605 and 610 can also each include high availability enablers 630 and 655 implemented on the high availability infrastructures 615 and 640. For example, as illustrated in FIG. 6A, the high availability enablers can be implemented on the high availability infrastructures 615 and 640 of each server 605 and 610 so that high availability features of the infrastructures 615 and 640 supporting the sessions can be provided to an application on the servlets 621, 626, 646, and 651 without having the application knowing how the high availability aspect is provided, i.e., the high availability function or feature is abstracted from the underlying technologies by the high availability enablers 630 and 655. However, it should be understood that different implementations can vary. For example, as illustrated in FIG. 6B, additional high availability enablers 680 and 685 may be implemented on the servers 605 and 610 and made available to applications 670 and 675 on or even external to the servers 605 and 610. In yet another implementation as illustrated in FIG. 6C, these high availability enablers 680 and 685 implemented on the servers 605 and 610 may be used instead of rather than in addition to the enablers implemented on the high availability infrastructures 615 and 640.

Therefore, an application can be written in SIP servlets 626 and 651 and HTTP servlets 621 and 646 and as illustrated in FIG. 6A, or as an application 670 or 675 using enablers written using SIP servlets 626 and 651 and HTTP servlets 621 and 646 as southbound adapters as illustrated in FIG. 6B, or as an application calling a combination of servlets 626 and 651 and HTTP servlets 621 and 646 as illustrated in FIG. 6C. That is, FIG. 6A shows a case in which the high availability enabler 630 and 655 is implemented below the current SIP servlets 626 and 651 and HTTP servlets 621 and 646 and is used to abstract the implementations of the SIP servlets 626 and 651 and HTTP servlets 621 and 646 from the underlying technologies used. Similarly, for applications running on top of SIP servlets 626 and 651 and HTTP servlets 621 and 646, a high availability enabler 680 or 685 can be available to allow the applications 670 and 675 to use it to save their own sessions.

Regardless of the level at which it is implemented, the high availability enabler can be implemented as explained above, i.e., abstracting use and functions of JGroups or Coherence or other high availability infrastructure and abstracting/providing possibly a concurrency/threading model. The high availability enabler can be present on the different application servers in the cluster to provide session data to the active instances of an application (or application server session). When the session fails, a new session can be created and uses the high availability enabler to restore its states. The high availability enabler can provide replication and restore the state of the entities it manages. Therefore, the high availability enabler may be adapted to provide appropriate modeling for locking of state and concurrency such as described, for example, in U.S. patent application Ser. No. 12/831,603 filed Jun. 7, 2010 by Maes and entitled "Protocol Level Communications for Protocol Level Composition with Session Sharing" of which the entire disclosure is incorporated herein by reference for all purposes.

Figure 7A:
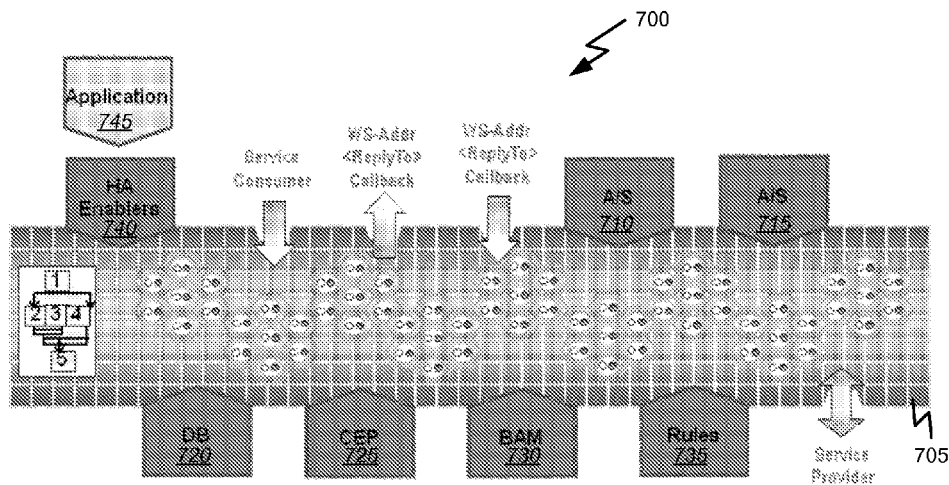
FIGS. 7A and 7B are block diagrams illustrating implementation of a high availability enabler to support grid computing according to one embodiment of the present invention.
Figure 7B:
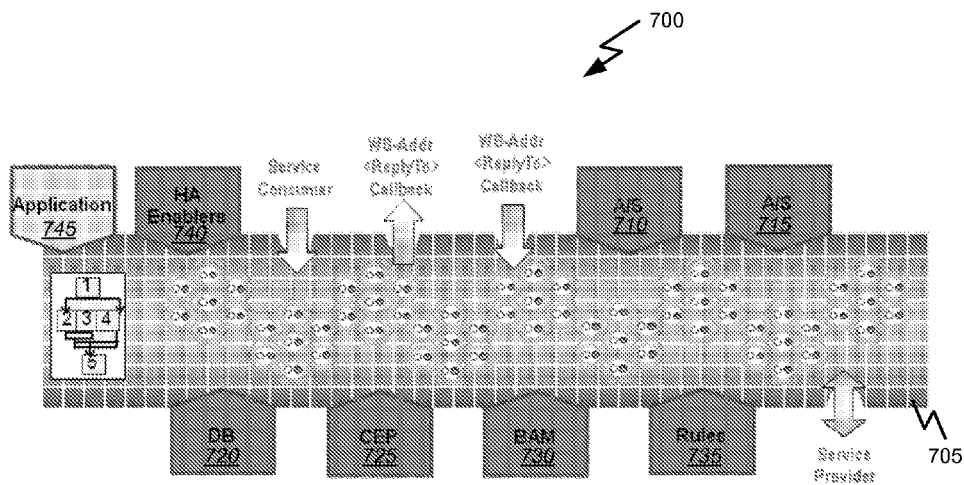

FIGS. 7A and 7B are block diagrams illustrating implementation of a high availability enabler to support grid computing according to one embodiment of the present invention. In these examples, a grid 705 can be implemented, for example on Coherence. The grid can support modules including but not limited to a database 720, Collaborative Engineering Programming (CEP) 725, Business Activity Monitoring (BAM) 730, various rules 735 and application servers 710 and 715. One or more high availability enablers 740 as described herein can be implemented on the grid 705 and can provide abstraction of the high availability functions of the grid 705, e.g., as provided by Coherence and detailed above, to an application 745 external to the grid 705 as illustrated in FIG. 7A or on the grid 705 as illustrated in FIG. 7B. So for example, caching and performances of data access and data exchanges across distributed nodes and high availability for such operations can be provided by the high availability enablers 740.

Figure 8A:
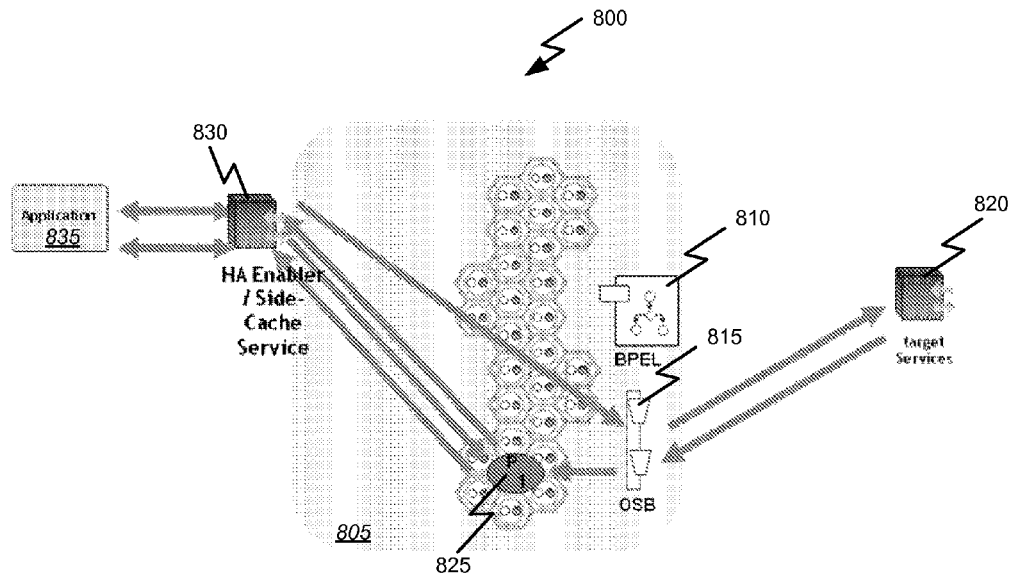
FIGS. 8A and 8B are block diagrams illustrating implementation of a high availability enabler to support caching according to one embodiment of the present invention.
Figure 8B:
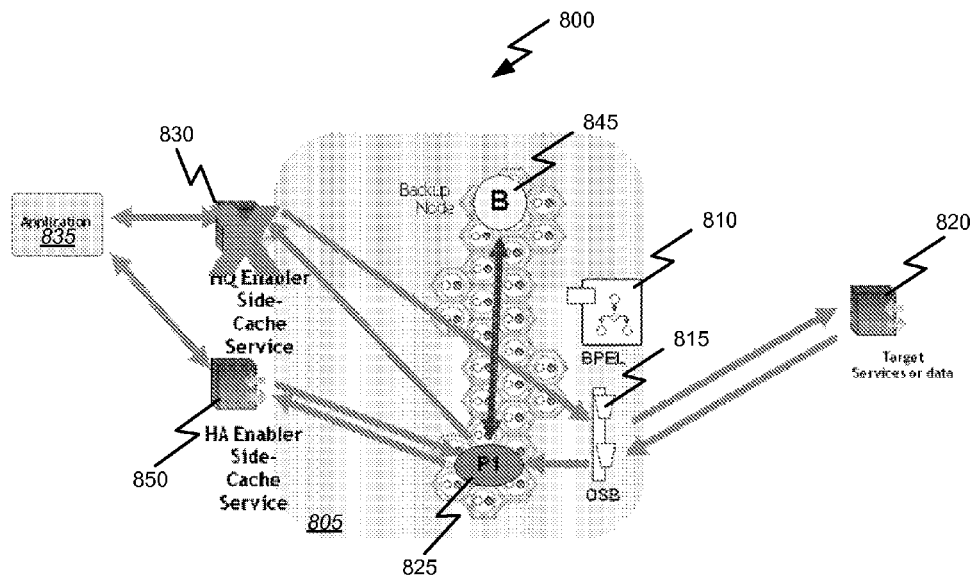

FIGS. 8A and 8B are block diagrams illustrating implementation of a high availability enabler to support caching according to one embodiment of the present invention. In this example, the system 800 includes a gird 805 implemented, for example on Coherence and including a node 825 comprising a cache The grid can also include a set of rules 810 for managing the grid etc. as well as an OSB. The system can provide or interact with one or more target services 820. For example, information exchanged with the target service 820 may be cached in node 825. This information may also be made available to an application 835 via a high availability enabler 830 as described herein. For example, the high availability enabler 830 can abstract the caching and/or other high availability functions of the grid 805 to the application 835

Caching can also be performed via the high availability functions of the grid 805 and another, backup node 845. Upon a failure of the first node 825, caching data exchanges can be assumed by the backup node 845. Additionally or alternatively, upon a failure of the high availability enabler 830, a new high availability enabler 850 can be instantiated and used for abstraction of the caching functions of the grid 805 to the application 835.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing availability, the method comprising:

receiving from a bus a request to perform one or more session actions from an application via a northbound interface of an availability enabler, the northbound interface providing an abstract interface for interacting with an availability infrastructure, the northbound interface of the availability enabler abstracting one or more functions of the availability infrastructure, wherein the availability infrastructure comprises a plurality of nodes, the plurality of nodes comprising at least one node supporting an active session and at least one node replicating the active session;
requesting the one or more functions from the availability infrastructure via one of a plurality of instances of the availability enabler, each instance of the availability enabler comprising southbound interface providing an interface specific to a different underlying technology of the availability infrastructure and decoupling application level processing from protocol level processing;
receiving a notification from the availability infrastructure via the southbound interface of the availability enabler; and
providing information related to the notification to the application via the northbound interface of the availability enabler.

2. The method of claim 1, wherein the one or more functions of the availability infrastructure comprise one or more of synchronous session control, asynchronous session control, session-less asynchronous control, concurrency management, reliable messaging, data distribution, wherein the data distribution includes storing at least some of the data local to the availability enabler, caching, session replication, providing fault tolerance, and providing predictable latencies.

3. The method of claim 1, wherein the availability infrastructure comprises JGroups.

4. The method of claim 1, wherein the availability infrastructure comprises Oracle Coherence.

5. The method of claim 1, further comprising, prior to requesting the one or more functions from the availability infrastructure, applying one or more policies to the request.

6. The method of claim 5, wherein the one or more policies comprise concurrency management policies.

7. The method of claim 1, further comprising, prior to providing information related to the notification to the application, applying one or more policies to the request.

8. The method of claim 7, wherein the one or more policies comprise concurrency management policies.

9. The method of claim 1, wherein receiving a notification from the availability infrastructure comprises receiving the request from a bus.

10. The method of claim 1, wherein the northbound interface of the availability enabler comprises an Application Program Interface (API).

11. The method of claim 1, wherein the one or more session actions comprise one or more of retrieving session data, changing session data, storing session data, persisting session data, distributing session data, creating a new session, locking the session, retrieving a session status, retrieving a session identifier, linking a session.

12. A system comprising:
a processor; and
a memory coupled with and readable by the processor and storing therein a set of instructions which, when executed by the processor, causes the processor to provide availability by:
receiving from a bus a request to perform one or more session actions from an application via a northbound interface of an availability enabler, the northbound interface providing an abstract interface for interacting with an availability infrastructure, the northbound interface of the availability enabler abstracting one or more functions of the availability infrastructure, wherein the availability infrastructure comprises a plurality of nodes, the plurality of nodes comprising at least one node supporting an active session and at least one node replicating the active session;
requesting the one or more functions from the availability infrastructure via one of a plurality of instances of the availability enabler, each instance of the availability enabler comprising southbound interface providing an interface specific to a different underlying technology of the availability infrastructure and decoupling application level processing from protocol level processing;
receiving a notification from the availability infrastructure via the southbound interface of the availability enabler; and
providing information related to the notification to the application via the northbound interface of the availability enabler.

13. The system of claim 12, wherein the one or more functions of the availability infrastructure comprise one or more of synchronous session control, asynchronous session control, session-less asynchronous control, concurrency management, reliable messaging, data distribution, wherein the data distribution includes storing at least some of the data local to the availability enabler, caching, session replication, providing fault tolerance, and providing predictable latencies.

14. The system of claim 12, wherein the availability infrastructure comprises JGroups.

15. The system of claim 12, wherein the availability infrastructure comprises Oracle Coherence.

16. The system of claim 12, further comprising, prior to requesting the one or more functions from the availability infrastructure, applying one or more policies to the request.

17. The system of claim 16, wherein the one or more policies comprise concurrency management policies.

18. The system of claim 12, further comprising, prior to providing information related to the notification to the application, applying one or more policies to the request.

19. The system of claim 18, wherein the one or more policies comprise concurrency management policies.

20. The system of claim 12, wherein receiving a notification from the availability infrastructure comprises receiving the request from a bus.

21. The system of claim 12, wherein the northbound interface of the availability enabler comprises an Application Program Interface (API).

22. The system of claim 12, wherein the one or more session actions comprise one or more of retrieving session data, changing session data, storing session data, persisting session data, distributing session data, creating a new session, locking the session, retrieving a session status, retrieving a session identifier, linking a session.

23. A computer-readable memory comprising a set of instructions stored therein which, when executed by a processor, causes the processor to provide availability by:
receiving from a bus a request to perform one or more session actions from an application via a northbound interface of an availability enabler, the northbound interface providing an abstract interface for interacting with an availability infrastructure, the northbound interface of the availability enabler abstracting one or more functions of the availability infrastructure, wherein the availability infrastructure comprises a plurality of nodes, the plurality of nodes comprising at least one node supporting an active session and at least one node replicating the active session;

requesting the one or more functions from the availability infrastructure via one of a plurality of instances of the availability enabler, each instance of the availability enabler comprising southbound interface providing an interface specific to a different underlying technology of the availability infrastructure and decoupling application level processing from protocol level processing;

receiving a notification from the availability infrastructure via the southbound interface of the availability enabler; and providing information related to the notification to the application via the northbound interface of the availability enabler.

* * * * *

UNITED STATES PATENT AND TRADEMARK OFFICE
CERTIFICATE OF CORRECTION

PATENT NO. : 8,930,527 B2
APPLICATION NO. : 12/786725
DATED : January 6, 2015
INVENTOR(S) : Maes Page 1 of 1

It is certified that error appears in the above-identified patent and that said Letters Patent is hereby corrected as shown below:

In the Specification

In column 1, line 52, delete "one" and insert -- on --, therefor.

In column 7, line 56, delete "session-ful" and insert -- session-full --, therefor.

In column 15, line 59, delete "2010" and insert -- 2010, --, therefor.

In column 16, line 27, delete "835" and insert -- 835. --, therefor.

Signed and Sealed this
Eighth Day of September, 2015

Michelle K. Lee
*Director of the United States Patent and Trademark Office*